US009111042B1

(12) United States Patent
Mendel

(10) Patent No.: US 9,111,042 B1
(45) Date of Patent: Aug. 18, 2015

(54) 1588 DETERMINISTIC LATENCY WITH GEARBOX

(75) Inventor: David W. Mendel, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 658 days.

(21) Appl. No.: 13/428,781

(22) Filed: Mar. 23, 2012

(51) Int. Cl.
*G06F 13/38* (2006.01)
(52) U.S. Cl.
CPC ................................. *G06F 13/385* (2013.01)
(58) Field of Classification Search
CPC .............................. G06F 13/14; G06F 13/385
USPC .......................................................... 702/79
See application file for complete search history.

(56) References Cited

U.S. PATENT DOCUMENTS

| 6,614,369 B1* | 9/2003 | Widmer ........................... 341/59 |
| 2005/0212523 A1* | 9/2005 | Chang et al. .................. 324/511 |
| 2009/0257445 A1* | 10/2009 | Chan et al. ..................... 370/463 |
| 2011/0191548 A1* | 8/2011 | Miller et al. ................... 711/153 |

* cited by examiner

*Primary Examiner* — Bryan Bui
(74) *Attorney, Agent, or Firm* — Ropes & Gray LLP

(57) ABSTRACT

Systems and methods are disclosed for precisely determining the delay between data being received at the pins of a circuit and being processed by gearbox circuitry, to being processed by a time-stamp unit of the circuit. In an exemplary embodiment, the gearbox circuitry may output a data valid signal which may be monitored by the time-stamp unit. By monitoring the data valid signal, the time-stamp unit may synchronize a local state machine with the internal state of the gearbox circuitry and thus determine the total delay through the combined processing circuitry with high accuracy.

21 Claims, 4 Drawing Sheets

| State (310) | Bits (320) | Overflow (330) | Data Valid (340) | Delay (350) |
|---|---|---|---|---|
| 1 | 40 | 40 | 0 | |
| 2 | 80 | 14 | 1 | 80 |
| 3 | 54 | 54 | 0 | |
| 4 | 94 | 28 | 1 | 94 |
| 5 | 68 | 2 | 1 | 68 |
| 6 | 42 | 42 | 0 | |
| 7 | 82 | 16 | 1 | 82 |
| 8 | 56 | 56 | 0 | |
| 9 | 96 | 30 | 1 | 96 |
| 10 | 70 | 4 | 1 | 70 |
| 11 | 44 | 44 | 0 | |
| 12 | 84 | 18 | 1 | 84 |
| 13 | 58 | 58 | 0 | |
| 14 | 98 | 32 | 1 | 98 |
| 15 | 72 | 6 | 1 | 72 |
| 16 | 46 | 46 | 0 | |
| 17 | 86 | 20 | 1 | 86 |
| 18 | 60 | 60 | 0 | |
| 19 | 100 | 34 | 1 | 100 |
| 20 | 74 | 8 | 1 | 74 |
| 21 | 48 | 48 | 0 | |
| 22 | 88 | 22 | 1 | 88 |
| 23 | 62 | 62 | 0 | |
| 24 | 102 | 36 | 1 | 102 |
| 25 | 76 | 10 | 1 | 76 |
| 26 | 50 | 50 | 0 | |
| 27 | 90 | 24 | 1 | 90 |
| 28 | 64 | 64 | 0 | |
| 29 | 104 | 38 | 1 | 104 |
| 30 | 78 | 12 | 1 | 78 |
| 31 | 52 | 52 | 0 | |
| 32 | 92 | 26 | 1 | 92 |
| 33 | 66 | 0 | 1 | 66 |
| 1 | 40 | 40 | 0 | |
| 2 | 80 | 14 | 1 | 80 |
| 3 | 54 | 54 | 0 | |

1588 DETERMINISTIC LATENCY WITH GEARBOX

BACKGROUND OF THE DISCLOSURE

In many important network applications there is a need to synchronize clocks running at various nodes in a computer network. Such synchronization of clocks over the network is generally achieved by transmitting data packets containing timestamps to the clocks being synchronized. The IEEE 1588 protocol standardized by the Institute of Electrical and Electronic Engineers (IEEE) is one protocol that can be used to synchronize clocks over a network. The IEEE 1588 protocol is designed to measure the time taken by data packets containing timestamps to travel across a communication medium (typically the Ethernet) and the time taken to transport these data packets over intermediate nodes in the network that may have variable buffering delays. However, after these data packets containing timestamps reach the receiver of a destination node there may be additional delays between the time instance when a data packet is received at the pins of the receiver and the time instance when the processing circuitry of the receiver reads the timestamp contained in the data packet. Typical implementations of the IEEE 1588 protocol do not account for these additional delays precisely.

There may be several sources of potential delay uncertainty between the time instance when a data packet is received at the pins of the receiver and the time instance when the processing circuitry of the receiver reads the timestamp contained in the data packet. For example, receivers in 10G-baseR Ethernet networks may include a deserializer circuit, a gearbox circuit, a word-aligner circuit, and/or a first-in-first-out (FIFO) queue circuit. Each of these circuits may potentially introduce delays as a data packet traverses that circuit.

Some 10G-baseR Ethernet networks do not need to resolve the delay uncertainties discussed above. Other 10G-baseR Ethernet networks make considerable effort to timestamp data packets on the pin-side of the gearbox circuit so that the receiver's processing circuitry can determine the delay introduced by the gearbox circuit. Yet other 10G-baseR Ethernet networks mark all data packets that are potentially IEEE 1588 protocol data packets at the pin-side of the gearbox circuit, create a special deterministic latency path that eventually feeds data packets to the receiver's processing circuitry, and finally re-tie each data packet from the special path. The latter two techniques for determining the delays introduced by various receiver circuitries are invasive and sometimes incompatible with existing receiver architectures.

SUMMARY OF THE DISCLOSURE

To address the above and other shortcomings within the art, the present disclosure provides methods and systems for precisely determining the delay from the time instance data is first received at the pins of a circuit to the time instance the data is processed by a processor of the circuit.

Methods and systems are provided for measuring a delay through processing circuitry. In an embodiment, the system includes physical medium attachment sub-layer (PMA) circuitry, gearbox circuitry, and processing circuitry. PMA circuitry may include deserializer circuitry. One or more pins of the PMA circuitry may receive serial data. PMA circuitry may be operative to deserialize the received serial data and convert the serial data to parallel data having a first data width. The gearbox circuitry may be operative to receive the parallel data having the first data width from the PMA circuitry and adapt the received data to parallel data having a second data width. The adaptation performed by the gearbox circuitry may take a variable amount of time. In an embodiment, the system may be operative to perform operations on parallel data having the second data width. In an embodiment, the parallel data having the second data width may be received by processing circuitry operative to determine a value of the delay between the serial data being received at the pin and the parallel data being received at the processing circuitry.

In an embodiment, the gearbox circuitry is operative to output a data valid signal whose value may be indicative of whether the parallel data output by the gearbox circuitry is a valid word. In an embodiment, the gearbox circuitry may cycle through a finite number of different states, with each state corresponding to a value of a data valid signal. The sequence of data valid signals may be indicative of the current state of the gearbox circuitry. The processing circuitry may be operative to receive the data valid signal. In an embodiment, the processing circuitry may maintain a local state machine operative to track the current state of the gearbox circuitry by evaluating a temporal sequence of the values of the received data valid signal. In an embodiment, each state of the gearbox circuitry may be indicative of the delay between the serial data being received at the pin and the parallel data being received at the processing circuitry.

In some embodiments, the system may additionally include word aligner circuitry operative to ensure that the parallel data having the second data width output by the gearbox circuitry is properly aligned to a word boundary. In an embodiment, the word aligner circuitry may be located on the data path between the gearbox circuitry and the processing circuitry. In an embodiment, the word aligner circuitry may not be located on the data path between the gearbox circuitry and the processing circuitry but may observe the data path at the output of the gearbox circuitry and control the operation of the gearbox circuitry such that the parallel data having the second data width output by the gearbox circuitry is properly aligned to a word boundary. In an embodiment, the word aligner circuitry may be operative to align the parallel data having the second data width output by the gearbox circuitry to a word boundary by adjusting the state of the gearbox circuitry.

In an embodiment, the PMA circuitry may have an initialization or start-up phase—every time this circuitry powers up, it may have to re-acquire a lock on the received data. Because of this initialization phase, the word aligner circuitry may have to re-adjust the state of the gearbox circuitry to align the parallel data having the second data width output by the gearbox circuitry to a word boundary.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which:

FIG. 3 is a table of the unique states of gearbox circuitry showing the delay associated with each state, according to an illustrative embodiment;

DETAILED DESCRIPTION OF THE INVENTION

To provide an overall understanding of the invention, certain illustrative embodiments will now be described. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1:
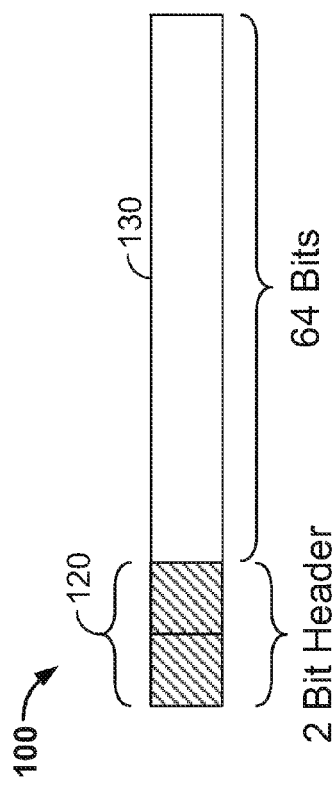
FIG. 1 is a simplified block diagram of a packet of a 64-bit to 66-bit (64B66B) encoding scheme, according to an illustrative embodiment.

FIG. 1 is a simplified block diagram of a packet of a 64B66B encoding scheme, according to an illustrative embodiment. Various serial data signal communication protocols employ a few more bits than the minimum number needed to actually represent the data being communicated. Such extra bits may be used for such purposes as indicating word alignment boundaries for block synchronization, parity checking, error correction coding, ensuring that there is no net direct current ("DC") in the data signal, etc. For example, several industry-standard codes have been or are being developed that transmit 66 bits for every 64 bits of "actual," "real," or "payload" data content. Such a signaling or communication protocol may be referred to as 64B66B encoding or the like. Another example of this type of code is 64-bit to 67-bit (64B67B) encoding, in which 67 bits are transmitted for every 64 bits of actual data content. For convenience herein, as shown in FIG. 1, all bits that are transmitted in addition to the actual data bits 130 will sometimes be referred to as extra bits 120 of protocol encoding. Thus in 64B66B encoding, for example, the two extra bits 120 beyond the 64 actual data bits 130 may be referred to as extra protocol bits or the like. To distinguish the 64 actual data bits from those two extra protocol bits, the actual data bits may sometimes be referred to herein as the actual data bits.

Figure 2:
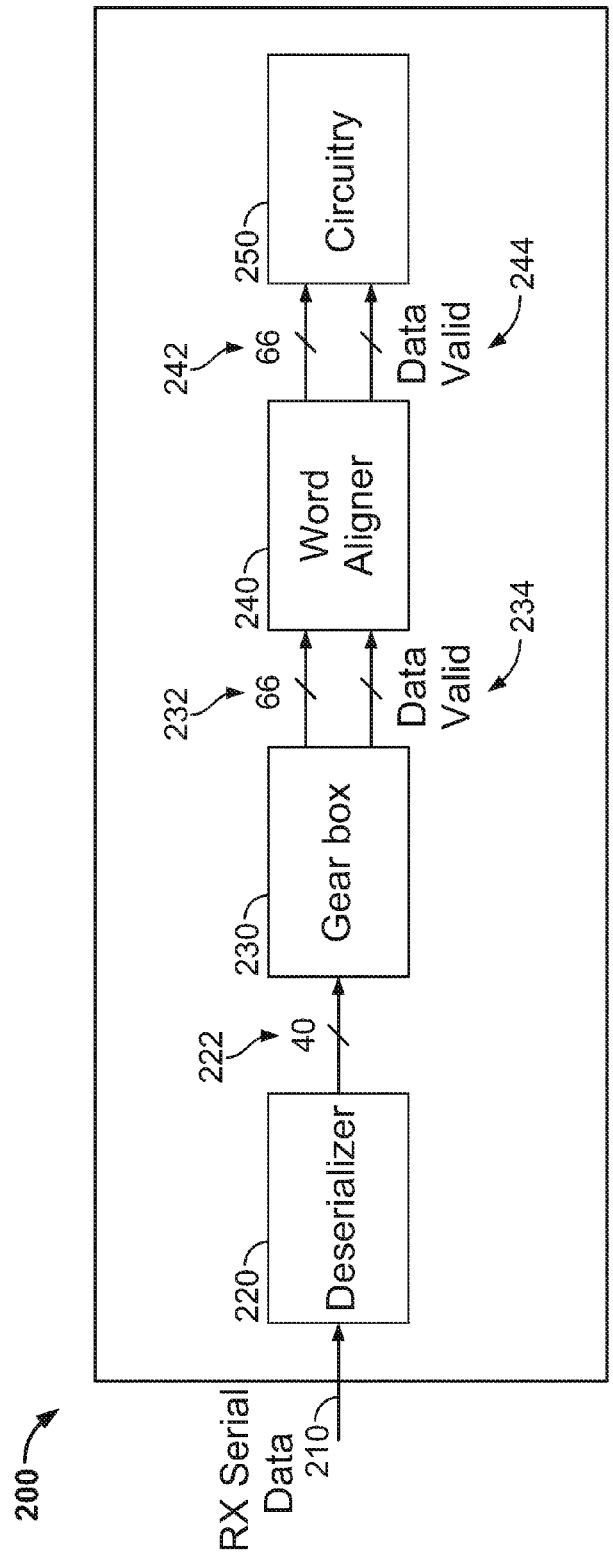
FIG. 2 is a simplified block diagram of a representative portion of receiver circuit 200, according to an illustrative embodiment.

FIG. 2 is a simplified block diagram of a representative portion of receiver circuit 200, according to an illustrative embodiment. Receiver circuit 200 can be an integrated circuit, an application-specific integrated circuit (ASIC), a programmable logic device (PLD), a field programmable gate array (FPGA), or a chip. It should also be understood that receiver circuit 200 may be a combination of devices, such as an FPGA and an ASIC, and/or may include additional, stand-alone circuit components. In an embodiment, receiver circuit 200 includes deserializer circuitry 220, gearbox circuitry 230, word aligner circuitry 240, and circuitry 250.

In an embodiment, deserializer circuitry 220 is connected to gearbox circuitry 230. Gearbox circuitry 230 is connected to word aligner 240. Word aligner 240 is connected to circuitry 250. Deserializer circuitry 220, gearbox circuitry 230, and word aligner circuitry 240 are described further below. Gearbox circuitry 230 is also described in greater detail in connection with FIG. 3. Receiver circuit 200 may also include, for example, block synchronizers, disparity checkers, descramblers, frame synchronizers, bit-error rate (BER) monitors, decoders and receive state machines (SMs), error checkers, clock data recovery (CDR) circuitry, and first-in first-out (FIFO) circuits (all not shown).

In an embodiment, deserializer circuitry 220 may receive serial data from external circuitry (not shown) via associated receiver (RX) serial data lead 210 and may partly convert the received serial data to a form more suitable for processing by receiver circuit 200. For example, deserializer circuitry 220 may deserialize incoming serial data into successive groups of parallel data bits. In an embodiment, deserializer circuitry 220 may be a part of physical medium attachment sub-layer (PMA) circuitry (not shown), which may include analog processing and may receive/transmit high-speed data streams.

In an embodiment, the data rate at which deserializer circuitry 220 receives serial data via lead 210 may be 10.3125 Gbps, which is the conventional data rate for 10G-baseR Ethernet. Deserializer circuitry 220 may accumulate successive bits of data received from lead 210 and outputs the data in parallel. The data width of the parallel data path output (i.e., the number of bits being output in parallel) from deserializer circuitry 220 may vary according to the application (e.g., using 8, 10, 16, 20, 32, or 40-bit deserialization factors). For ease of explanation and not of limitation, we henceforth use the example that the width of the parallel data output from deserializer circuitry 220 is 40 bits. Deserializer circuitry 220 may be connected to gearbox circuitry 230 via leads 222. The parallel data, output from deserializer 220, may be sent as an input to gearbox circuitry 230.

In an embodiment, gearbox circuitry 230 is operable to convert data from one data path width to a different data path width. The relationship between the input data path width and the output data path width is referred to as the gearbox ratio. For example, deserializer circuitry 220 may convert serial data to a data path width of 40 bits while circuitry 250 may be operable to operate on data having a data path width of 66 bits (e.g., when the 10G-baseR communication protocol is used). In such a case, a 40:66 gear box may adapt data on the 40-bit wide data path output by deserializer circuitry 220 into data on a 66-bit wide data path for circuitry 250. In 10G-baseR, other widths such as 66/2=33 or 66*2=132 may be used. However, these other widths may still require a gearbox as described above.

The gearbox ratio may also indicate the relationship between the clocks utilized by circuitry that provides input to gearbox circuitry 230 and circuitry to which gearbox circuitry 230 provides output. For example, the 10G-baseR communication protocol may transmit data at 10.3125 Gbps. If the width of the data path at the output of deserializer circuitry 220 is 40 bits, the clock utilized by deserializer circuitry 220 may operate at 10.3125 Gbps/40 bits=258 MHz. If the width of the data path at the output of gearbox circuitry 230 is 66 bits, the clock utilized by circuitry to which gearbox circuitry 230 provides output (i.e., the clock driving word aligner circuitry 240 and circuitry 250) may operate at approximately 10.3125 Gbps/66 bits=156 MHz.

Gearbox circuitry 230 may be connected to word aligner circuitry 240 via leads 232. Gearbox circuitry 230 may be operable to transmit data adapted to the data path width of 66 bits to word aligner circuitry 240 through leads 232. Gearbox circuitry 230 may additionally be operable to output data valid signal 234 through other leads, which is described in greater detail below in connection with FIG. 3.

In an embodiment, word aligner circuitry 240 is operable to barrel shift data (i.e., shift a data word by a specific number of bits) it receives from gearbox circuitry 230 in order to align received data to a word boundary. For example, in 64B66B encoding protocol (see FIG. 1), the two extra bits (also referred to as header bits) are always {01} or {10} while the actual data bits may be random. In an embodiment, word aligner circuitry 240 may be operable to align data received from gearbox circuitry 230 by barrel shifting it such that the header bits are always of the form {01} or {10}. Once proper word alignment is obtained, word aligner circuitry 240 may declare word-lock.

Word aligner circuitry 240 may be connected to circuitry 250 via leads 242. Word aligner circuitry 240 may be operable to transmit the aligned data to circuitry 250 through leads 242. Word aligner circuitry 240 may additionally be operable to output data valid signal 244 through other leads. Word aligner circuitry 240 may additionally be operable to output the amount of barrel shifting performed.

In an embodiment, word aligner circuitry 240 may not be connected directly to gearbox circuitry 230 and may instead simply observe the data path at the output of gearbox circuitry 230. In an embodiment, as described in greater detail below, word aligner circuitry 240 may be operable to observe the data path at the output of gearbox circuitry 230 and control the operation of gearbox circuitry 230 such that proper word alignment is obtained.

In an embodiment, circuitry 250 is operable to make any desired use of data it receives from word aligner circuitry 240. Circuitry 250 will be described in greater detail below in connection with FIG. 4.

FIG. 3 shows a table of the unique states of gearbox circuitry 230 of FIG. 2 showing the delay associated with each state, according to an illustrative embodiment. As discussed above, in connection with FIG. 2, gearbox circuitry 230 is operable to adapt data on the 40-bit wide data path output by deserializer circuitry 220 of FIG. 2 into data on a 66-bit wide data path for use by circuitry 250 of FIG. 2. In some embodiments, gearbox circuitry 230 of FIG. 2 may be of data-valid form, i.e., circuitry from which gearbox circuitry 230 receives input and circuitry which receives output from gearbox circuitry 230 may operate at the same clock rate and gearbox circuitry 230 may output a flag that indicates if the data output is valid or not. For example, if the gearbox ratio of gearbox circuitry 230 of FIG. 2 is 40:66, then both circuitry from which gearbox circuitry 230 receives input and circuitry which receives output from gearbox circuitry 230 may operate at 10.3125 Gbps/40 bits=258 MHz and gearbox circuitry 230 may output data valid signal 234 that may have a logic-high value when the data output by gearbox circuitry 230 is valid. For illustrative purposes, the following description is based on the use of gearbox circuitry 230 of FIG. 2 with gearbox ratio 40:66 although gearbox circuitry with other gearbox ratios may also be used with similar results.

In an embodiment, gearbox circuitry 230 of FIG. 2 receives 40-bit wide parallel data on a 40-bit wide data path and adapts it to 66-bit wide parallel data on a 66-bit wide data path. Gearbox circuitry 230 may accomplish this task by collecting data received on the 40-bit wide data path until 66 bits have been collected. For example, gearbox circuitry 230 may receive a total of 80 bits over two clock cycles and may select 66 of those bits to output. In an initial clock cycle, gearbox circuitry 230 may receive 40-bits of parallel data (also referred to as a 40-bit word) from deserializer circuitry 220 of FIG. 2. Gearbox circuitry 230 may be operable to store the received bits in a buffer or any other internal or external storage device. Because gearbox circuitry 230 may not have collected a sufficient number of bits in the initial clock cycle to be able to output a 66-bit word, gearbox circuitry 230 may output data valid signal 234 with a logic-low value indicating that the output of gearbox circuitry 230 is not valid.

This initial state (state 1) of gearbox circuitry 230 of FIG. 2 is illustrated in row 1 of FIG. 3. Column 310 of FIG. 3 denotes various states of gearbox circuitry 230. Column 320 denotes the number of bits that gearbox circuitry 230 has received but which it has not yet output. For example, in the initial clock cycle (i.e., state 1 of gearbox circuitry 230 of FIG. 2), gearbox circuitry 230 has 40 bits that it has not yet output. Column 330 denotes the number of overflow bits, i.e., bits that are left over after outputting a valid 66-bit word. For example, in state 1, gearbox circuitry 230 has not outputted any 66-bit word yet and therefore has 40 overflow bits. Column 340 denotes whether data valid signal 234 output by gearbox circuitry 230 is logic-high (indicated by 1), corresponding to valid data output, or logic-low (indicated by 0), corresponding to an invalid data output. Column 350 denotes the delay (in units of 100 pico seconds) introduced by gearbox circuitry 230 in outputting each successive valid 66-bit word. Because gearbox circuitry 230 does not output a valid 66-bit word in state 1, no value is entered in row 1 of column 350 of FIG. 3.

In the next clock cycle, corresponding to state 2 of gearbox circuitry 230, this circuitry may receive an additional 40 bits of parallel data from deserializer circuitry 220, bringing the total number of bits that gearbox circuitry 230 has not yet output to 80 bits. This is depicted in row 2 of column 320 of FIG. 3. Gearbox circuitry 230 may now output a 66-bit word on lead 232 because the circuitry has received a sufficient number of bits to do so. Gearbox circuitry 230 may additionally output data valid signal 234 with a logic-high value indicating that the data it output is valid. Row 2 of column 330 of FIG. 3 shows that after gearbox circuitry 230 has output the 66-bit word, some extra (80−66=14) overflow bits remain. Row 2 of column 350 shows that the delay introduced by gearbox circuitry 230 in outputting the first 66-bit word is 8 Unit Intervals (UI). A unit interval may be defined as the time to transmit one bit. For example, if the system clock is operating at 10.3125 Gbps, 1 UI corresponds to 96.97 ps (1 sec/10.3125E9), or approximately 0.1 ns. In above example, the value of the delay is 8 UIs because 80 high speed clock cycles (at 10.3125 GHz) were required for 80 bits to be received by gearbox circuitry 230. This delay corresponds to the time taken by the most significant bit of the 66-bit word, which is output by gearbox circuitry 230, from being received at the pins of deserializer circuitry 220 to being output by gearbox circuitry 230.

In the next clock cycle, corresponding to state 3 of gearbox circuitry 230, this circuitry may receive an additional 40 bits of parallel data from deserializer circuitry 220. Because gearbox circuitry 230 had 14 overflow bits remaining in state 2, the number of bits received by gearbox circuitry 230 that it has not output yet is 54 (i.e., 14+40) bits. Because the number of bits received by gearbox circuitry 230 that it has not yet output is less than 66 bits, gearbox circuitry 230 may output data valid signal 234 having a logic-low value.

In the next clock cycle, corresponding to state 4 of gearbox circuitry 230, this circuitry may receive an additional 40 bits of parallel data from deserializer circuitry 220, bringing the total number of bits that gearbox circuitry 230 has not yet output to 94 (i.e, 54+40) bits. This is depicted in row 4 of column 320 of FIG. 3. Gearbox circuitry 230 may now output a 66-bit word on lead 232 because the circuitry has received a sufficient number of bits to do so. Gearbox circuitry 230 may additionally output data valid signal 234 with a logic-high value indicating that the data this circuitry output is valid. Row 4 of column 330 of FIG. 3 shows that after gearbox circuitry 230 has output the 66-bit word, some extra (94−66=28) overflow bits remain. Row 4 of column 350 shows that the delay introduced by gearbox circuitry 230 in outputting the first 66-bit word is 9.4 UIs because 94 high speed clock cycles (at 10.3125 GHz) were required for 94 bits to be received by gearbox circuitry 230.

The process described in the preceding paragraphs in connection with FIG. 3 may be repeated. As shown in column 340 of FIG. 3, the operation of gearbox circuitry 230 according to this process leads to a specific sequential pattern of data valid signal 234. In particular, the sequence of the values of data valid signal 234 and the pattern of overflow bits shown in column 330 of FIG. 3 repeat after cycling through 33 unique states of gearbox circuitry 230.

Other deserialization factors (e.g., 8, 10, 16, 20, 32, 40, and 64) and/or gearbox circuitries with gearbox ratios other than 40:66 may also lead to specific sequential patterns of data valid signal 234 although the number of unique states of gearbox circuitry 230 with the use of those deserialization factors may be different.

In an embodiment, knowledge of the current state of gearbox circuitry 230, as shown in column 310 of FIG. 3, may allow a precise determination of the delay incurred by the most significant bit of a 66-bit word from the time instance it was received at the pins of deserializer circuitry 220 to the time instance it was output by gearbox circuitry 230. Specifically, by evaluating the sequential pattern of data valid signal 234 and thus determining a current state of gearbox circuitry 230 (as will become clear from the description of FIG. 4 below), it may be possible to precisely determine the delay without requiring invasive hooks or probes into gearbox circuitry 230. Furthermore, it may be possible to determine the current state of gearbox circuitry 230 by examining only a small portion of the sequential pattern of data valid signal 234.

Figure 4:
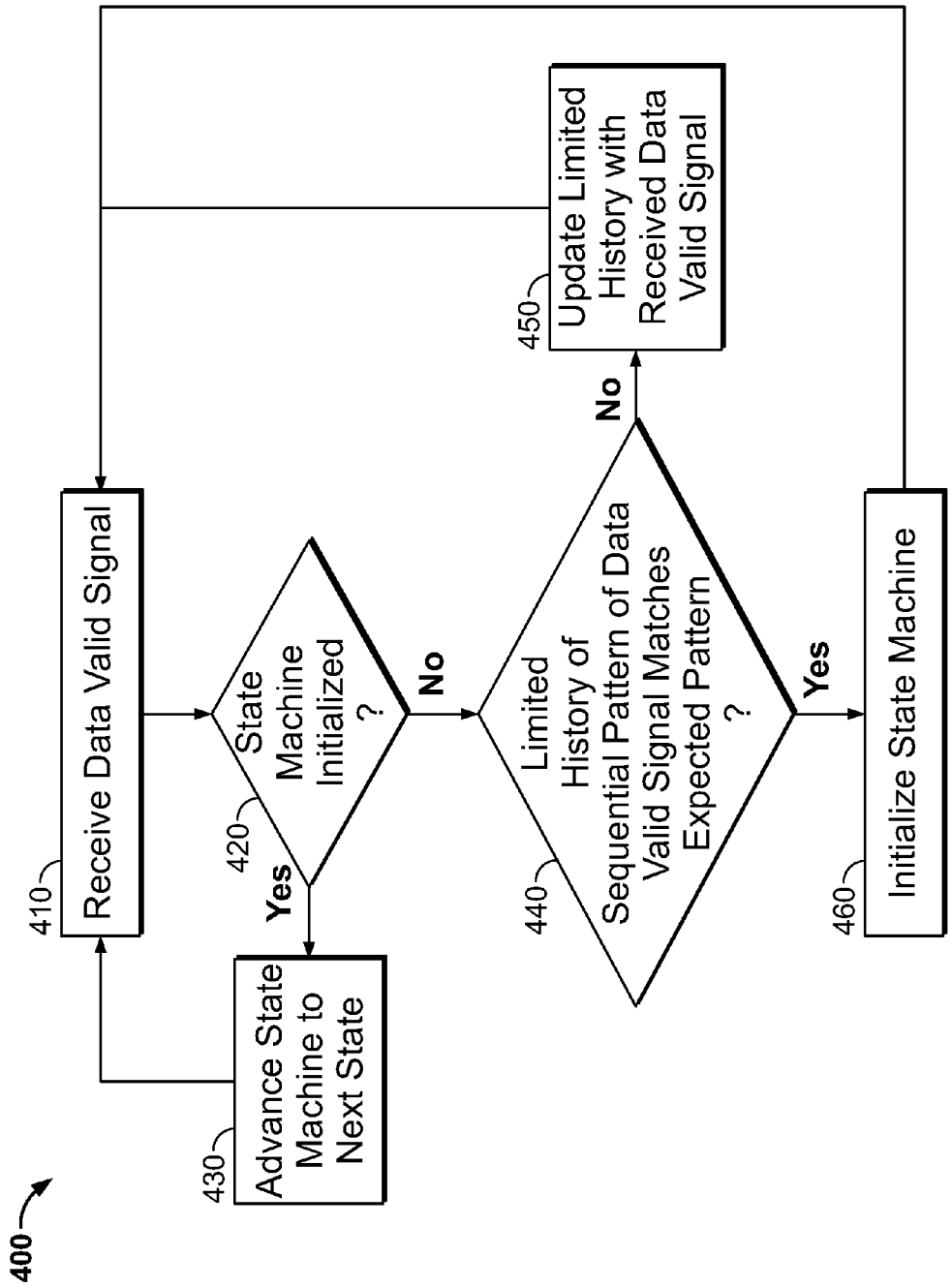
FIG. 4 is a flow chart of illustrative steps performed to initialize a local state machine of processing circuitry, according to an illustrative embodiment.

FIG. 4 shows a flow chart of illustrative steps performed to initialize a local state machine of circuitry 250 of FIG. 2, according to an illustrative embodiment. In an embodiment, circuitry 250 may employ a local finite state machine to determine the current state of gearbox circuitry 230 and subsequently track the state of gearbox circuitry 230. Circuitry 250 may store states of the local state machine using appropriate data structures in any suitable internal or external storage device (not shown).

Process 400 may begin at operation 410 where circuitry 250 may receive data valid signal 234. At operation 420, circuitry 250 may determine whether the local state machine has already been initialized. At operation 420, if it is determined that the state machine has been initialized, the process may proceed to operation 430 where circuitry 250 may increment the state of the state machine to the next state. The process may then proceed back to operation 410.

At operation 420, if it is determined that the state machine has not been initialized, the process may proceed to operation 440 where circuitry 250 may compare a stored limited history of the received values of data valid signal 234 against an expected pattern. For example, when gearbox circuitry 230 has 33 unique states because it uses a 40:66 gearbox ratio, consideration of the five most recent values of data valid signal 234 may be sufficient to determine if the local state machine should be initialized. It should be noted that the comparison of five most recent values of data valid signal 234 is merely an illustrative example when gearbox circuitry 230 has gearbox ratio 40:66. The number of values to be compared may be different when gearbox circuitry 230 uses a different gearbox ratio. In particular, if the five most recent values of data valid signal 234 are (1,1,0,1,1) then it may indicate that gearbox circuitry 230 has completed cycling through its 33 unique states and that the next state of gearbox circuitry 230 will be state 1. Accordingly, circuitry 250 compares the five most recently received values of data valid signal 234 against the expected pattern of (1,1,0,1,1) to determine the state of gearbox circuitry 230 of FIG. 2. At operation 440, if it is determined to determining that the five most recently received values of data valid signal 234 do not match the expected pattern, the process may proceed to operation 450 where circuitry 250 updates the five most recently received values of data valid signal 234 by discarding the oldest of the five received values of data valid signal 234 and including the value of data valid signal 234 most recently received in operation 410 to the history. The process may then proceed to operation 410.

At operation 440, if it is determined that five most recently received values of data valid signal 234 match the expected pattern, the process may proceed to operation 460 where circuitry 250 may initialize the local state machine to state 1. The process may then proceed to operation 410. The state of the local state machine may mirror the current state of gearbox circuitry 230 from this point onwards because the local state machine can be said to have been synchronized to the current state of gearbox circuitry 230.

Using process 400, circuitry 250 can keep track of the state of gearbox circuitry 230 and accordingly, the delay. The process described above in connection with FIG. 4 describes the steady state operation of gearbox circuitry 230.

In some embodiments, word aligner circuitry 240 may be operable to correct the word alignment. In some embodiments, word aligner circuitry 240 may not be on the data path shown in FIG. 2 but may nevertheless be operable to control the state of data valid signal 234 by adjusting the state of gearbox circuitry 230. In some embodiments, word aligner circuitry 240 may simply observe the data path that connects gearbox circuitry 230 to circuitry 250. In such a situation, word aligner circuitry 240 may not introduce any additional delays of its own into the data path.

As described above in connection with FIG. 4, the local state machine of circuitry 250 may be in one of 33 states (when gearbox circuitry 230 uses a 40:66 gearbox ratio) once it has been synchronized with the state of gearbox circuitry 230. Depending on the state of gearbox circuitry 230, some of the bits of the parallel data output by gearbox circuitry 230 may be placed in a current 66-bit word and some may be placed in a next 66-bit word. If the current word is valid (e.g., properly aligned), it may be ready to be processed by the next logic circuit on the data path, which in the current example, is circuitry 250. The current word, i.e., the 66-bits of parallel data output by gearbox circuitry 230, may be said to be valid when the $66^{th}$ bit (most significant bit) of data received by the PMA circuitry is located at the $66^{th}$ bit position of the 66-bit word output by gearbox circuitry 230.

When the PMA circuitry starts up, the $66^{th}$ bit may be located at an arbitrary bit position relative to the 66-bits output by gearbox circuitry 230. For example, the $66^{th}$ bit may be located at bit position 10 of a 66-bit word output by gearbox circuitry 230, in which case 55 bits of the 66-bit word output by gearbox circuitry 230 may appear as part of a first valid 66-bit word and the remaining 11 bits may appear as part of a second valid 66-bit word. This example illustrates the situation when the parallel data (e.g., 66-bit words) output by gearbox circuitry 230 are not properly aligned. When the parallel data are properly aligned, the $66^{th}$ bit (most significant bit) is located at the $66^{th}$ bit position of the 66-bit parallel data output by gearbox circuitry 230.

When the parallel data output by gearbox circuitry 230 are improperly aligned, the states of gearbox circuitry 230 may be manipulated to properly align the data output. In an embodiment, the states of gearbox circuitry 230 may be adjusted by word aligner circuitry 240. In particular, word aligner circuitry 240 may cause the state of gearbox circuitry 230 to slip. When the state of gearbox circuitry 230 using gearbox ratio 40:66 is slipped, gearbox circuitry 230 may receive 40 additional bits from deserializer circuitry 220 and discard the previous set of 40 bits received.

Slipping the state of gearbox circuitry 230 has the effect of changing the alignment (i.e., position) of the bits of the parallel data output by gearbox circuitry 230. In particular, the position of a given bit in the parallel data output by gearbox circuitry 230 may move backwards by 40 modulus 66 bit positions every time the state of gearbox circuitry 230 is slipped, when a 40:66 gearbox ratio is used by gearbox circuitry 230. When the gearbox ratio used by gearbox circuitry 230 is different, the number of bit positions by which the position of a given bit in the parallel data output by gearbox circuitry 230 moves backwards may also be different.

Referring to FIG. 3, consider the instance when gearbox circuitry 230 is in state 6, as an example. As shown in FIG. 3, in state 5, gearbox circuitry 230 had 2 overflow bits. Accordingly, the first bit of the next 40 bits received by gearbox circuitry 230 in state 6 may be placed at bit position 2 of the 66-bit word that gearbox circuitry 230 is generating. No overflow bits remain in state 6. When gearbox circuitry 230 receives the next 40 bits in state 7, the first bit of the received 40 bits may be placed at bit position 42 of the 66-bit word that gearbox circuitry 230 is generating.

Now suppose that state 6 is slipped, i.e., the states of gearbox circuitry 230 progress as (5, 6, 6, 7). Recall, in state 6, bit positions 0 through 41 are already occupied by bits already received from deserializer circuitry 220 and therefore the next bit may be placed at bit position 42. However, when state 6 is slipped, the bits located at bit positions 2 through 41 are discarded and an additional 40 bits received from deserializer circuitry 220. Therefore, the bit that would have been placed at bit position 42 of the 66-bit word output by gearbox circuitry 230 may instead be placed at bit position 2. This may move the word alignment backwards by 40 modulus 66. Note that slipping a state may result in overwriting some data as described above. However, overwriting of data is not problematic because circuitry 250 may ignore all data it receives until proper word-alignment is achieved.

Generally, if a state of gearbox circuitry 230 is slipped, it may cause the word-alignment to move by −40 mod 66 bit positions. If the state of gearbox circuitry 230 was slipped 33 times, gearbox circuitry 230 would cycle through all possible even word-alignments.

As an additional example, suppose the start of word is in bit position 14, i.e., the $66^{th}$ bit is located at bit position 14 of the 66-bit word that gearbox circuitry 230 is generating. To obtain correct word alignment, the $66^{th}$ bit should instead be located at the 0 bit position of the 66-bit word that gearbox circuitry 230 is generating. Accordingly, world aligner circuitry 220 may slip the state of gearbox circuitry 230 once and check to see if proper word-alignment has been achieved. That is, upon slipping the state of gearbox circuitry 230, bit position 14 may move to bit position (14−40 mod 66)=−26 mod 66=40. If proper word alignment has not been achieved, word aligner circuitry 220 may slip the state of gearbox circuitry 230 once again. This time, upon slipping the state of gearbox circuitry 230, but bit position 40 may move to bit position (40−40 mod 66)=−0 mod 66=0, which is the desired bit position for word alignment.

In some embodiments, it may be possible that repeatedly slipping the state of gearbox circuitry 230 may not result in proper word alignment, e.g., word alignment may be off by 1 bit position. For example, suppose the start of word is in bit position 15, i.e., the $66^{th}$ bit is located at bit position 15 of the 66-bit word that gearbox circuitry 230 is generating. Then slipping the state of gearbox circuitry 230 repeatedly may at most move the $66^{th}$ bit to bit position 1 instead of the desired 0 bit position. In this situation, an additional barrel shift of 1 bit position may be performed to achieve proper word alignment.

Because word alignment may be achieved through an additional barrel shift that is not captured by the process of slipping the state of gearbox circuitry 230, the delay introduced by the additional barrel shift may not be determinable by simply knowing the current state of gearbox circuitry 230. Therefore, in such instances, there may be an uncertainty regarding the value of the delay determined by circuitry 250, as the delay could be 0 or 1 UI, with an uncertainty of +−½ UI, which corresponds to approximately 48.5 pico seconds.

In some embodiments, in each instance that the PMA circuitry powers up, the word alignment may be off. Accordingly, word aligner circuitry 220 may slip the state of gearbox circuitry 230 one or more times to attain the proper word alignment. The above example is illustrative, however, other values of delays may also be possible.

Figure 5:
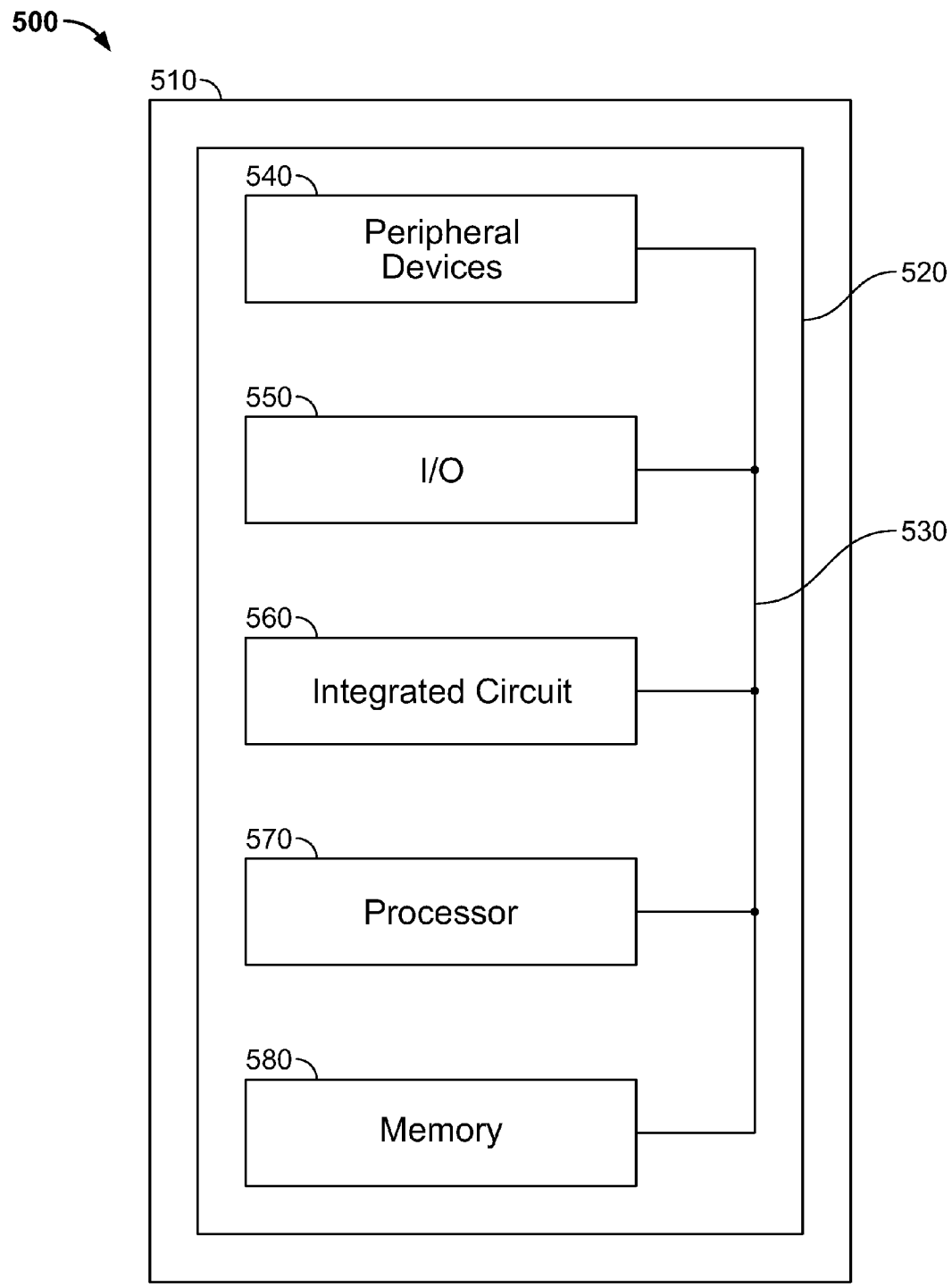
FIG. 5 illustrates a circuit or other device that includes embodiments of the delay determination circuits described herein as being within a data processing system.

FIG. 5 illustrates a circuit or other device that includes embodiments of the delay determination circuits described herein as being within a data processing system 500. In an embodiment, the circuit or device may be an integrated circuit, application specific standard product (ASSP), application specific integrated circuit (ASIC), programmable logic device (PLD), full-custom chip, or dedicated chip. In an embodiment, circuit 560 may be substantially similar to circuit 100. Data processing system 500 can include one or more of the following components: a processor 570, memory 580, I/O circuitry 550, and peripheral devices 540. These components are connected together by a system bus or other interconnections 530 and are populated on a circuit board 520 which is contained in an end-user system 510.

System 500 could be used in a wide variety of applications, such as computer networking, data networking, instrumentation, video processing, digital signal processing, or any other application where the advantage of using programmable or reprogrammable logic is desirable. Circuit 560 can be used to perform a variety of different logic functions. For example, circuit 560 can be configured as a processor or controller that works in cooperation with processor 570. Circuit 560 may also be used as an arbiter for arbitrating access to a shared resource in system 500. In yet another example, circuit 560 can be configured as an interface between processor 570 and one of the other components in system 500. It should be noted that system 500 is only exemplary, and that the true scope and spirit of the invention should be indicated by the following claims.

Although components in the above disclosure are described as being connected with one another, they may instead be connected to one another, possibly via other components in between them. It will be understood that the foregoing are only illustrative of the principles of the invention, and that various modifications can be made by those skilled in the art without departing from the scope and spirit of the invention. One skilled in the art will appreciate that the present invention can be practiced by other than the described embodiments, which are presented for purposes of illustration and not of limitation, and the present invention is limited only by the claims that follow.

What is claimed is:

1. A system for measuring a delay, the system comprising:
a pin operative to receive data;
gearbox circuitry operative to convert the received data to parallel data and output the parallel data, wherein the gearbox circuitry is coupled to the pin; and processing circuitry coupled to the gearbox circuitry, wherein the processing circuitry is operative to:
receive the parallel data; and
determine, based at least in part on a determined state of a plurality of states of the gearbox circuitry, a value of the delay between the data being received at the pin and the parallel data being received at the processing circuitry, wherein the determined state of the plurality of states of the gearbox circuitry is determined by evaluating a temporal sequence of values of a data valid signal.

2. The system of claim 1, wherein the gearbox circuitry is further operative to:
output the data valid signal, wherein:
the data valid signal has a first value if the parallel data is a valid word; and
the data valid signal has a second value if the parallel data is an invalid word; and
cycle through the plurality of states.

3. The system of claim 2, wherein each state of the plurality of states of the gearbox circuitry corresponds to the value of the delay.

4. The system of claim 2, wherein the processing circuitry is further operative to:
receive the data valid signal from the gearbox circuitry; and
determine the state of the plurality of states of the gearbox circuitry based on the temporal sequence of the values of the received data valid signal.

5. The system of claim 2, wherein the processing circuitry is further operative to track a state of the plurality of states of the gearbox circuitry.

6. The system of claim 1, wherein the value of the delay corresponds to time taken after a most significant bit of the data is received at the pin, to be received by the processing circuitry.

7. The system of claim 1 further comprising a word aligner circuitry coupled to the gearbox circuitry, and wherein the word aligner circuitry is operative to align the parallel data to a boundary between words.

8. The system of claim 1, wherein the system has an initialization phase.

9. The system of claim 8 further comprising adjusting a state of the gearbox circuitry to compensate for the initialization phase of the system.

10. The system of claim 1, wherein the processing circuitry is further operative to determine the state of the plurality of states of the gearbox circuitry based on a data valid signal provided by the gearbox circuitry, and the data valid signal indicates whether the parallel data is a valid word or an invalid word.

11. A method for measuring a delay, the method comprising:
receiving data at a pin;
converting, using gearbox circuitry, the received data to parallel data;
receiving, from the gearbox circuitry, the parallel data at processing circuitry; and
determining, using the processing circuitry and based at least in part on a determined state of a plurality of states of the gearbox circuitry, a value of the delay between the data being received at the pin and the parallel data being received at the processing circuitry, wherein the determined state of the plurality of states of the gearbox circuitry is determined by evaluating a temporal sequence of values of a data valid signal.

12. The method of claim 11, further comprising:
outputting, using gearbox circuitry, the data valid signal, wherein:
the data valid signal has a first value if the parallel data is a valid word; and
the data valid signal has a second value if the parallel data is an invalid word.

13. The method of claim 12, wherein each state of the plurality of states of the gearbox circuitry corresponds to the value of the delay.

14. The method of claim 13 further comprising tracking, using the processing circuitry, a state of the plurality of states of the gearbox circuitry.

15. The method of claim 12 further comprising:
receiving, using the processing circuitry, the data valid signal from the gearbox circuitry; and
determining, using the processing circuitry, the state of the plurality of states of the gearbox circuitry based on the temporal sequence of the values of the received data valid signal.

16. The method of claim 11, wherein the value of the delay corresponds to time taken after a most significant bit of the data is received at the pin, to be received by the processing circuitry.

17. The method of claim 11 further comprising aligning the parallel data to a boundary between words using word aligner circuitry.

18. The method of claim 11 further comprising adjusting a of the gearbox circuitry to compensate for an initialization phase.

19. A system, comprising:
gearbox circuitry operative to convert data received by a pin to parallel data; and
processing circuitry operative to:
receive the parallel data from the gearbox circuitry; and
determine, based at least in part on a determined state of a plurality of states of the gearbox circuitry, a delay value between the data being received at the pin and the parallel data being received at the processing circuitry, wherein the determined state of the plurality of states of the gearbox circuitry is determined by evaluating a temporal sequence of values of a data valid signal.

20. The system of claim 19, wherein the gearbox circuitry is further operative to:
output the data valid signal, wherein:
the data valid signal has a first value if the parallel data is a valid word; and
the data valid signal has a second value if the parallel data is an invalid word; and
cycle through the plurality of states.

21. The system of claim 20, wherein the processing circuitry is further operative to:
receive the data valid signal from the gearbox circuitry; and
determine the state of the plurality of states of the gearbox circuitry based on the temporal sequence of the values of the received data valid signal.

* * * * *